United States Patent
Groh et al.

[11] 3,788,726
[45] Jan. 29, 1974

[54] PRODUCING IMAGES OF PARTS OF AN OBJECT WHICH LIE AT DIFFERENT DEPTHS BY MEANS OF HOLOGRAPHIC TOMOGRAPHY

[75] Inventors: Gunther Groh, Hamburg; Ulf Tiemens, Oldenburg, both of Germany

[73] Assignee: U.S. Philips Corporation, New York, N.Y.

[22] Filed: Oct. 27, 1971

[21] Appl. No.: 192,823

[30] Foreign Application Priority Data
Oct. 30, 1970  Germany..................2053391

[52] U.S. Cl. .................. 350/3.5, 250/313
[51] Int. Cl. .......................... G02b 27/00
[58] Field of Search ............ 350/3.5; 250/61.5, 313

[56] References Cited
UNITED STATES PATENTS
3,610,722  10/1971  Bestenreiner et al................ 350/3.5
3,630,594  12/1971  Gorog................. 350/3.5
3,530,780  9/1970  Haynes............... 350/3.5

OTHER PUBLICATIONS

Groh et al., "Applied Optics," Vol. 9, No. 3, March 1970 pp. 775–777.
Martienssen et al., "Physics Letters" Vol. 24A, No. 2, Jan. 1967, pp. 126–128.
De Bitteto, "Applied Optics," Vol. 8, No. 8, Aug. 1969 pp. 1740–1741.

Primary Examiner—Ronald J. Stern
Attorney, Agent, or Firm—Frank R. Trifari

[57] ABSTRACT

A method of, and an apparatus for, producing images of details of an object which lie at different depths by means of holographic tomography is described. The component holograms which correspond to the images of the object from different perspectives are so illuminated in time sequence that the reconstructed images are incoherently superposed on one another.

11 Claims, 4 Drawing Figures

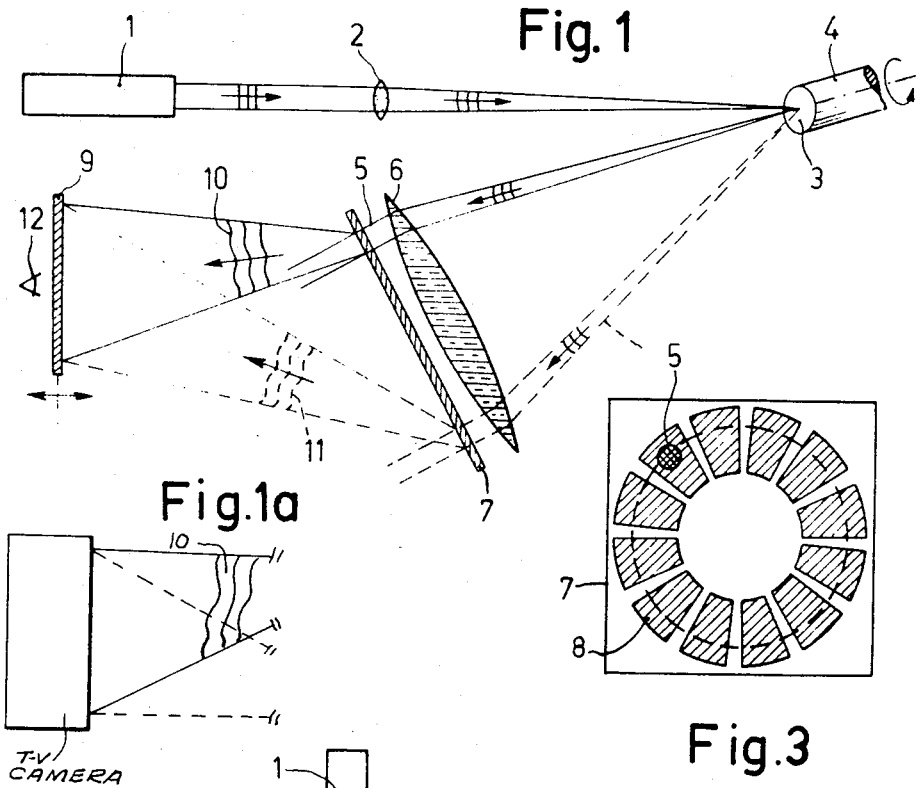
Fig. 1
Fig. 1a
Fig. 3
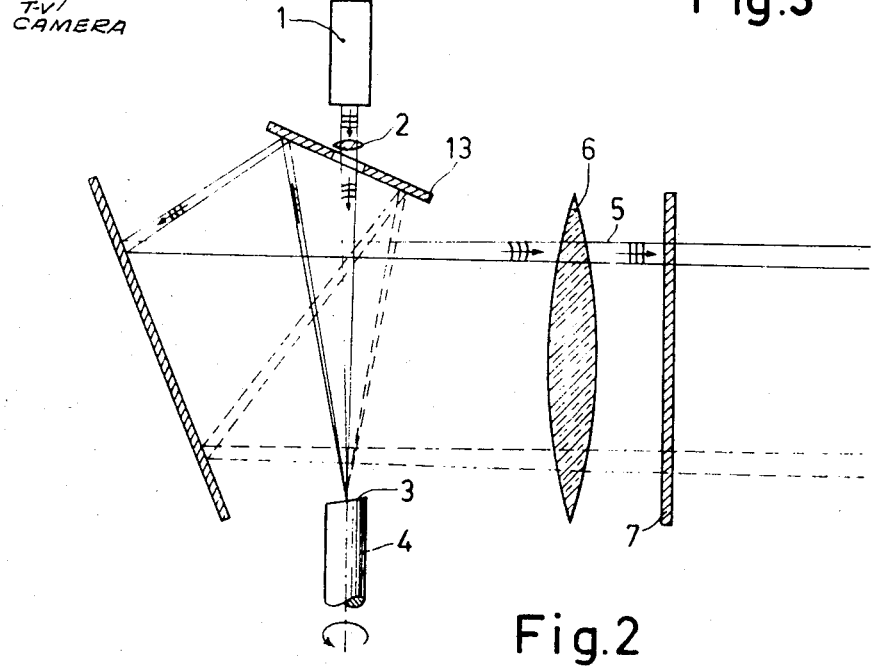
Fig. 2

PRODUCING IMAGES OF PARTS OF AN OBJECT WHICH LIE AT DIFFERENT DEPTHS BY MEANS OF HOLOGRAPHIC TOMOGRAPHY

The invention relates to a method of producing images of parts of an object which lie at different depths by means of holographic tomography, in which a plurality of component holograms made of images of the object from different perspectives are arranged along a curve which corresponds to the curve described by a source of radiation when taking the images, and these component holograms are illuminated with a reconstruction beam. In practice this otherwise tried and true method gives rise to difficulty.

In some cases it may be desirable for the component holograms to be arranged along complicated curves in a plane. The purpose of this is to avoid that when imaging a part of the object which lies at a given depth sharp images are also formed of object parts lying at other depths (see for example F. Buchmann: "Nachbarschichten und Verwischung bei der Tomographie" (adjacent strata and blurring in tomography) in "Rontgenstrahlen," 1967, 16, page 20). According to the known method, in the reconstruction process the composite hologram is illuminated by a reconstruction wave in the form of the conjugate-complex reference wave through a diaphragm which uncovers only those component holograms which are required for the formation of the desired image. This has the disadvantage that as a rule by far the greater part of the light is lost and the reconstructed images are very dim.

A further difficulty occurs when the number of images which display the object from different perspectives and hence the number of component holograms is to be restricted, for example to reduce the exposure to radiation of a patient in radiography. The effective total aperture of the hologram then becomes so small that the reconstructed image shows stark granulation or speckling, which may render the image useless.

These disadvantages of the known method are avoided according to the present invention. The method according to the invention is characterized in that by so deflecting the reconstruction beam that the component holograms arranged along the curve are illuminated sequentially in time the real images reconstructed from the component holograms are incoherently superposed on one another.

Thus the entire output power of, for example, a laser source which provides the reconstruction beam may be used for reconstruction. When in this method the reconstruction beam is deflected at a higher rate than corresponds to the resolution of the eye in time, the observer will be given the same impression in respect of the depth of the real image as is the case in the known methods. Since, however, the images now are incoherently superposed on one another while the granulation is different for each individual image, an increase in the number of component holograms will result in a reduction in granulation owing to averaging. In analogy to the known method of Martienssen and Spiller described in "Holographic Reconstruction without Granulation," "Physics Letters," 24A (1967) page 126, this effect may be increased in that during the making of the component holograms not only the images are interchanged but also the position of a ground-glass plate through which the images are illuminated is changed.

According to the present invention the method of holographic tomography may also be improved in another respect. For this purpose the reference beam is deflected at so slow a rate that the eye is just able to follow the motion due to the continuous change of the reconstructed images, but the much finer structure of the granulation is blurred already. For the observer this provides a further criterion in determining the depth of a detail of the object. Whereas in the known method the position of the sharpest image is to be found, in the novel method the surface on which the images are superposed on one another (for example the surface of a ground-glass plate) may be positioned so that the respective detail of the object does not move any more. Simple variation of the scanning speed enables the mode of observation to be rapidly changed.

The system for deflecting the reconstruction beam may be, for example, a digital light deflecting device. The use of such a device is of particular advantage when the beam is to be deflected along very complicated curves. In certain cases it is of advantage to statistically distribute the component holograms over a plane. In this case only the digital light deflecting device enables these holograms to be irradiated in a loss-free manner.

Embodiments of the invention will now be described, by way of example, with reference to the accompanying diagrammatic drawings, in which:

FIG. 1 shows an apparatus for carrying out the method according to the invention, FIG. 1a is a modified embodiment of FIG. 1, FIG. 2 is a modified embodiment FIG. 1, and FIG. 3 shows the arrangement of the component holograms in the hologram plane.

In the Figures corresponding elements are designated by like reference numerals.

Referring now to FIG. 1, a light beam produced by a laser 1 is focussed by means of a lens 2 and impinges on a mirror 3 mounted on a rotating shaft 4. The normal to the mirror is at a slight angle to the longitudinal direction of the rotating shaft, so that on rotation of the mirror the reflected beam describes the curved surface of a cone. The position of the focus of the lens 2 is chosen so that all the spherical waves produced by reflection at the rotating mirror have a common center of curvature which coincides with the vertex of the cone. An image of this common point is formed by means of a further lens system 6 through the component holograms at a point the location of which corresponds to that of the common reference source used in making the component holograms. Advantageously a plane reference wave is used. In this case the lens 6 is a simple collimator.

A suitable choice of the relative aperture of the lens 2 and of the focal length of the lens 6 ensures that the cross-sectional area of each reconstruction beam 5 in a hologram plane 7 has the size required for holographic tomography. With the exception of reflection losses all the light from the laser 1 then falls on a component hologram in the plane 7. Thus, of each component hologram 8 illuminated by this reference beam 5 wave fronts 10 and 11 are successively reconstructed which produce the corresponding real images on a ground-glass plate 9. These images are superposed on one another in depth to the sharp image only of an object detail the depth of which corresponds to the real position of the plate 9. This enables an observer 12 to determine the depth positions of individual details by measurably displacing, tipping or pivoting the ground-glass plate 9 in the direction of projection, for the blurring of details lying at other depths is either elliptical or circular, depending on the positions of the hologram plane 7 and the ground-glass plate 9.

The apparatus described may be used in various manners. For example, after focussing, the ground-glass plate may be replaced by a film cassette to make tomographic recordings of an object detail of interest. In some cases it will be preferable to project the reconstructed real images directly on the photo-sensitive layer of a movable television camera the movement of which is measurable. In this case, the size of the real image is adapted to the diameter of the photosensitive layer by varying the scale used in making the individual recordings and the component holograms.

In the apparatus shown in FIG. 2 the reconstruction beam is deflected by causing it to fall through an opening in a mirror 13 on the rotating mirror 3. The beam reflected by the mirror 3 is subsequently reflected at the mirror 13. Such an arrangement facilitates focussing and has the advantage that an exactly circular movement of the beam is obtainable. In addition, this apparatus has a compact structure.

I claim:

1. A method of holographic tomography, comprising the steps of forming a plurality of images of a three-dimensional object corresponding to views of the object from spatially separated points along a curve, separately holographically recording each image, arranging each of the holographic recordings in locations corresponding to the positions where each image was formed, sequentially illuminating each hologram with a moving coherent reference beam, whereby each image is sequentially reconstructed in a common reconstruction area, and moving an imaging plane medium through the reconstruction area whereby the portion of the superimposed images corresponding to different depth planes of the three-dimensional object may be selectively observed.

2. A method as claimed in claim 1 wherein the step of sequentially illuminating each hologram comprises the step of deflecting the coherent reference beam at a rate higher than the persistance rate of the human eye.

3. A method as claimed in claim 1, wherein the step of sequentially illuminating each hologram comprises the step of deflecting the coherent reference beam at a rate lower than the persistance rate of the human eye.

4. Apparatus for holographic tomography, comprising a plurality of holographic recordings corresponding to views of a three-dimensional object from spatially separated points along a curve and arranged in locations corresponding to the points along the curve, means for sequentially illuminating each hologram with a moving coherent reference beam, whereby each image is sequentially reconstructed in a reconstruction area, and an imaging plane medium movably arranged in the reconstruction area whereby the portions of the superimposed reconstructed images corresponding to different depth planes of the three-dimensional object may be selectively observed.

5. Apparatus as claimed in claim 4, wherein the means for sequentially illuminating the holographic recordings comprises a coherent source of radiation, a rotating shaft, and a mirror mounted on the rotating shaft at an angle to the axis of rotation of the shaft.

6. Apparatus as claimed in claim 5, wherein the illuminating means further comprises an optical system for focussing the radiation of the coherent radiation source on the mirror as a spherical wave, whereby all the spherical waves reflected by the rotating mirror have a common center of curvature.

7. Apparatus as claimed in claim 6, further comprising a second optical system in the path of the radiation from the mirror and forming an image of the common center of curvature at a location corresponding to that of the reference source used to make the holographic recordings.

8. Apparatus as claimed in claim 5, further comprising a second stationary mirror having an aperture in the path of the radiation from the coherent source and having a reflective surface in the path of the radiation from the rotating mirror.

9. Apparatus as claimed in claim 4, wherein the movably arranged imaging plane medium comprises a movable ground-glass plate.

10. Apparatus as claimed in claim 4, wherein the imaging plane medium comprises a movably arranged film cassette.

11. Apparatus as claimed in claim 4, wherein the imaging plane medium comprises a photo-sensitive layer of a television camera.

* * * * *

PO-1050
(5/69)

UNITED STATES PATENT OFFICE
CERTIFICATE OF CORRECTION

Patent No. 3,788,726          Dated January 29, 1974

Inventor(s) GUNTHER GROH and ULF TIEMENS

It is certified that error appears in the above-identified patent and that said Letters Patent are hereby corrected as shown below:

ON THE TITLE PAGE

"[30]     Foreign Application Priority Data

Oct. 30, 1970   Germany................2053391"

should read

--[30]     Foreign Application Priority Data

Oct. 30, 1970   Germany............P.2053391.9--;

Signed and sealed this 10th day of September 1974.

(SEAL)
Attest:

McCOY M. GIBSON, JR.               C. MARSHALL DANN
Attesting Officer                   Commissioner of Patents Signed and sealed this     day of           1974